Figure 1:
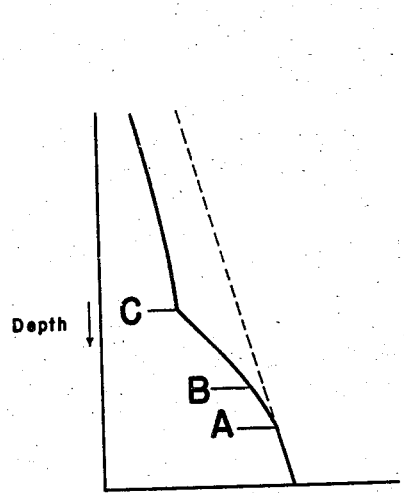

Nov. 10, 1942.     C. E. REISTLE, JR     2,301,326
PROCESS FOR OBTAINING TEMPERATURE GRADIENTS IN BORE HOLES
Filed Nov. 3, 1939     2 Sheets-Sheet 1

Carl E. Reistle Jr. INVENTOR.

BY
ATTORNEY.

Patented Nov. 10, 1942

2,301,326

UNITED STATES PATENT OFFICE 2,301,326

PROCESS FOR OBTAINING TEMPERATURE GRADIENTS IN BORE HOLES

Carl E. Reistle, Jr., Houston, Tex., assignor to Standard Oil Development Company, a corporation of Delaware Application November 3, 1939, Serial No. 302,724

1 Claim. (Cl. 73—51)

The present invention relates to a method for determining temperatures in a bore hole.

Specifically, the invention relates to a method for determining temperature within a flowing well. More specifically, the invention is directed to a method for determining the temperature at a series of points, or the temperature gradient, of a flowing well, and from the results obtained determining the position in the bore hole at which the oil components and gaseous components produced by the well enter the bore hole.

It is known to take temperature measurements in dry bore holes in order to determine natural temperature gradients of the earth. It is also known to take temperature measurements in a well after a casing is cemented in order to determine the position of the cement plug in the bore hole, but when such measurements are obtained they are taken immediately after the cement is placed in the bore hole and while a cement plug is still in the bottom of the casing so that the thermometer has no opportunity to come in contact with fluids from the producing formations of the well.

It is an object of the present invention to obtain an accurate temperature gradient within a flowing well by the use of a conventional type of bore hole thermometer suspended by a cable.

More particularly, it is an object of the present invention to provide a cased well with a string of tubing having a plug in its lower end, and to progressively obtain the temperature along the length of the string of tubing by lowering a thermometer within the tubing while the well is producing through the annular space between the casing and the tubing. It has been discovered that an accurate temperature gradient may be obtained for a flowing well by lowering a thermometer into a string of tubing having a closed end, and that after such temperature gradients are obtained the position of various strata penetrated by the bore hole may be determined. For example, in oil wells the temperature gradient of a flowing well enables the point at which the oil enters the bore hole from the producing formation to be determined, and if gas from a gas producing formation or gas cap enters the bore hole, the point of entry of the gas into the oil or the so-called gas-oil contact may also be determined.

Other objects and advantages of the invention may be seen from the following description taken with the drawings in which Figs. 1, 2, 3 and 4 are curves, the solid lines being graphical representations of temperature gradients obtained from the lower portions of different wells and the dashed lines indicating the earth's thermal gradient in the immediate vicinity of the respective wells; and Figs. 1a, 2a, 3a and 4a are sectional views of the wells from which the respective temperature gradients were obtained showing the relationship of the strata penetrated by the bore holes of the respective wells with the temperature gradients obtained.

In accordance with the present production practice, the bore hole of a well is provided with a casing cemented within the bore hole to prevent a leakage of fluid between the casing and the wall of the bore hole. Inside the casing is provided a string of tubing through which fluid is produced from the well.

In accordance with the present invention a string of tubing suspended within the casing in a well is provided at its bottom with a plug, and a bore hole thermometer is run through the tubing to obtain the temperature gradient while the well is being produced through the annular space between the tubing and the casing. If it is desired to obtain better heat transfer, the tubing may be filled with a liquid, such as water or oil, before the thermometer is run through the tubing.

Figure 1A:
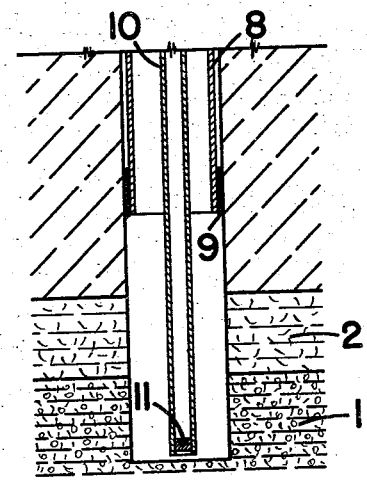

Referring specifically to Figs. 1 and 1a a bore hole penetrates an oil producing formation 1 which has a gas producing formation 2 immediately above it. The bore hole is provided with a casing 3 placed with its lower end somewhat above gas producing formation 2, and provided with the usual cement plug 9. Inside casing 8 is the string of tubing 10 through which the well is customarily produced.

In order to obtain the curve shown in Fig. 1, tubing 10 was provided with plug 11 at its lower end. The well was then allowed to produce at a high rate, the fluid flowing in the annular space between casing 8 and tubing 10, and a thermometer was lowered down the tubing 10 and a series of temperature determinations obtained.

In Fig. 1 the temperature gradient for the flowing well shows, as expected, that the lowest part of the bore hole has the highest temperature. The section of the curve extending up to A indicates that the flow up to this point has a temperature gradient coinciding with the earth temperature gradient. At point A the temperature decreased rapidly to point B and from point B the temperature decreased even more rapidly to point C. Above point C the well fluid had a temperature gradient parallel with the temperature gradient of the earth, as shown by the dashed line.

Formations 1 and 2 in the bottom of the well shown in Fig. 1a were hard formations relatively non-porous to flow in a vertical direction. After the temperature gradient shown in Fig. 1 was obtained, a packer was set in the well between the wall of the bore hole and tubing 10 at a point immediately below the gas producing stratum, that is to say, at a depth between points A and B on the curve. After the packer was set, plug 11 was removed from the tubing and the well allowed to produce through the tubing 10. This procedure reduced the gas-oil ratio from 12,500 cubic feet per barrel to 730 cubic feet per barrel.

Figure 2:
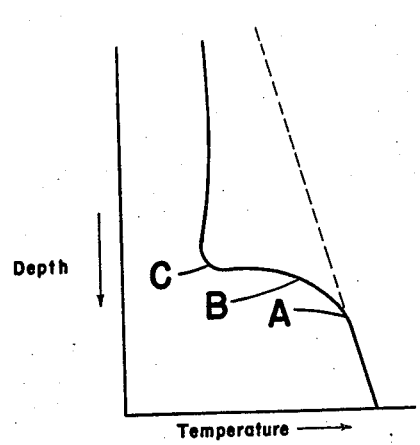
Figure 2A:
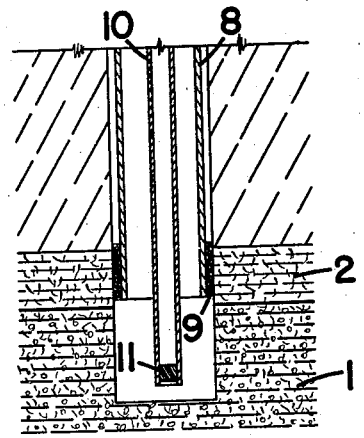

A slightly different temperature gradient is shown by Figs. 2 and 2a. In completing this well it was realized that formation 2 might produce a large amount of gas, so an attempt was made to set the lower end of casing 8 to a point below the gas producing formation 2 in order to close off the gas producing formation, and obtain a lower gas-oil ratio from the well. However, the lower end of the casing was not placed at a low enough level and large quantities of gas were produced with the oil. As shown by the temperature gradient in Fig. 2, the channeling of the gas down into the oil produces a break in the temperature gradient at A, but a much sharper break is produced at B where the gas flows directly into the bore hole. The cooling effect is so great that after the entry of the gas is stopped at point C, the temperature of the fluid mixture produced by the well shows a substantial increase as it flows upwardly in the well, due to the absorption of heat from the earth.

Figure 3:
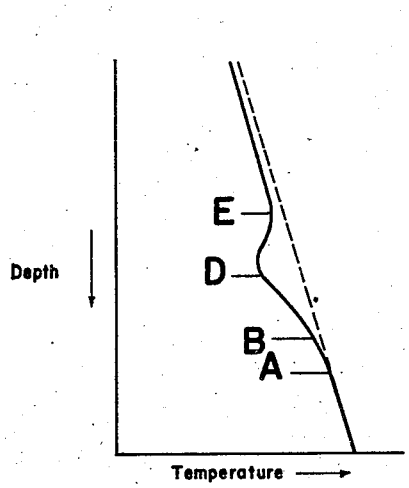
Figure 3A:
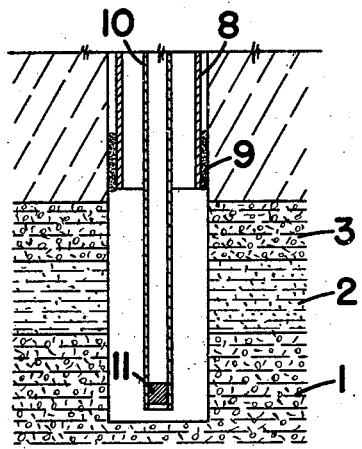

In Figs. 3 and 3a the lower end of the bore hole penetrates an oil producing formation 1 which has above it gas producing formation 2 and superimposed on gas producing formation 2 is an oil producing formation 3. In completing the well the lower end of casing 8 was cemented above the oil producing formation 3. The temperature gradient obtained from this well differs from that obtained in the two preceding wells in that in addition to the temperature breaks at points A and B caused by the cooling effect of expanding gas there is an additional break at D caused by the heating effect of the warm oil flowing into the well, and then another break at E where the flow of the oil into the bore hole ceases.

Figure 4:
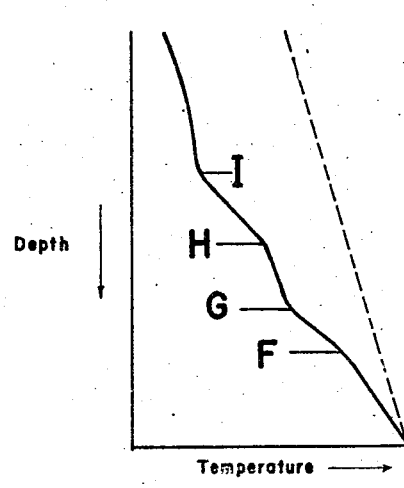
Figure 4A:
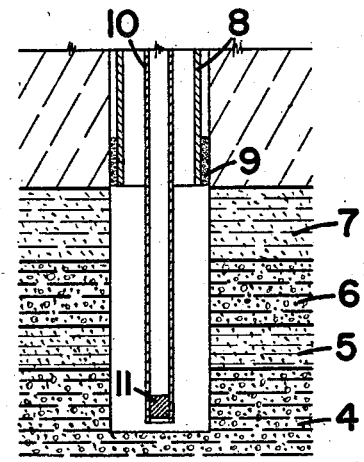

In the well shown by Fig. 4a the bore hole ends in a number of producing formations. Strata 4 and 6 produce mixtures of oil with gas, that is to say, oil is predominant in the mixtures, while strata 5 and 7 produce mixtures of gas and oil, that is, mixtures containing large proportions of gas and small proportions of oil. This well was completed with the lower end of casing 8 at the top of producing formation 7 so that strata 4, 5, 6 and 7 were all producing formations.

The temperature gradient of Fig. 4 obtained from this well shows breaks at points F, G, H and I. From a lower portion of the curve to point F cooling was produced by the expanding gas in the fluid which contained a major portion of oil. From points F to G the cooling was more rapid because the fluid mixture entering the well between these points contained a major portion of gas. From points G to H the temperature gradient resembled that of the lower end of the curve to point F while the portion of the curve from H to I is similar to that from F to G because of the similarity of the formations.

After obtaining temperature gradients such as those shown in Figs. 1, 2, 3 and 4 of wells in which the position or positions at which large quantities of gas flow into the well are indicated, the wells may be reworked by any one of a number of methods in order to produce fluid having a low gas-oil ratio and in order to conserve the gas energy within the earth.

For example, in the well shown in Fig. 2a, a liner may be cemented within the well a short distance below gas producing formation 2 in order to shut out the gas and produce a low gas-oil ratio well. On the other hand, cement may be squeezed out of the well at a point immediately below the casing and allowed to harden in order to seal off the gas formation. As a third alternative, a packer may be set between the wall of the bore hole and the wall of the tubing 10 in order to close off the point of entrance of the gas into the fluid produced through the tubing.

In a similar manner the wells shown in Figs. 3a and 4a may be reworked by setting liners or cementing them, or by setting packers or by other methods which are or may become available to the art in order to reduce the gas-oil ratio of the fluid produced by these wells.

Having fully described my invention, what I desire to claim is:

A method of obtaining the temperature gradient in a well comprising the steps of arranging within the well a conduit of substantially less cross-sectional area than the bore of the well provided with means for preventing the flow of well fluid therein, allowing fluid to be produced by said well through the space between said conduit and the wall of the well, and making a series of temperature measurements along spaced points in said conduit while the well is producing.

CARL E. REISTLE, Jr.